United States Patent [19]

Omori et al.

[11] Patent Number: 5,384,293
[45] Date of Patent: Jan. 24, 1995

[54] RARE EARTH OXIDE-ALUMINA-SILICA SINTERED BODY AND METHOD OF PRODUCING THE SAME

[76] Inventors: Mamoru Omori, 1-1-42; Toshio Hirai, 3-4-91, both of Takamori, Izumi-ku, Sendai-shi, Miyagi 981-31, Japan

[21] Appl. No.: 66,005

[22] PCT Filed: Sep. 28, 1992

[86] PCT No.: PCT/JP92/01236
§ 371 Date: May 25, 1993
§ 102(e) Date: May 25, 1993

[87] PCT Pub. No.: WO93/06058
PCT Pub. Date: Apr. 1, 1993

[30] Foreign Application Priority Data

Sep. 26, 1991 [JP] Japan .................... 3-273602

[51] Int. Cl.$^6$ ............. C04B 35/10; C04B 35/50
[52] U.S. Cl. .................... 501/128; 501/152
[58] Field of Search .................... 501/128, 152

[56] References Cited

FOREIGN PATENT DOCUMENTS

| 2538370 | 6/1984 | France | 501/152 |
| 0067564 | 5/1980 | Japan | 501/152 |
| 60-59194 | 12/1985 | Japan . | |
| 2283663 | 11/1990 | Japan . | |
| 3218963 | 9/1991 | Japan . | |
| 1028641 | 7/1983 | U.S.S.R. | 501/152 |

Primary Examiner—David Brunsman
Assistant Examiner—Deborah Jones
Attorney, Agent, or Firm—Dvorak and Traub

[57] ABSTRACT

In order to provide a rare earth oxide-alumina type sintered body having no defect such as void and pore, and high strength, toughness and reliability, silica is added to a mixture of rare earth oxide and alumina to control a crystal grain size of the sintered body to not more than 30 μm, whereby abnormal grain growth and occurrence of pore are restrained to produce a practically usable rare earth oxide-alumina-silica sintered body having excellent strength and toughness and uniform structure. According to this production method, rare earth oxide-alumina-silica sintered bodies having no defect such as void and pore, and high strength, toughness and reliability can easily be obtained.

13 Claims, No Drawings

RARE EARTH OXIDE-ALUMINA-SILICA SINTERED BODY AND METHOD OF PRODUCING THE SAME

TECHNICAL FIELD

This invention relates to a rare earth oxide-alumina-silica sintered body and a method of producing the same, and more particularly to a rare earth oxide-alumina-silica sintered body having a high strength, an excellent toughness and a dense structure obtained by controlling abnormal growth of crystal grains, which abnormal growth causes the lowering of strength and toughness, and a method of producing the same.

BACKGROUND ART

The oxide ceramics possess high-temperature strength and are excellent in heat resistance, oxidation resistance and corrosion resistance. Such oxide ceramics can reliably be used up to at least a temperature lower by not higher than several hundred degrees centigrade from a melting point thereof. Therefore, rare earth oxides (oxide of rare earth element or a mixture thereof) and alumina are expected to be used as a high-temperature ceramic material. Particularly, a mixed ceramic containing two oxides is considered to be effective as a so-called high-temperature material because the melting point is about 2000° C.

In the mixed oxide ceramics, however, when a mixture of oxides is fired to obtain a sintered body, abnormal growth of crystal grains causes a large crystal grain size of not less than 100 $\mu$m, so that there are caused pores which reduce densification. Furthermore, the resulting sintered body is weak in strength, toughness and hardness.

For instance, in case of $Ln_4Al_2O_3$ compounds, Ln is Y, Sm, Eu, Gd, Tb, Dy, Ho, Er, Tm, Yb, Lu and a mixture thereof, and $LnAlO_3$ compounds, Ln is Y, La, Ce, Pr, Nd, Sm, Eu, Gd, Tb, Dy, Ho, Er, Tm, Yb, Lu and a mixture thereof, there is a bad drawback that very brittle polycrystalline sintered bodies are only obtained because a twin is formed through martensitic transformation in the sintering.

On the other hand, one of the methods for controlling the abnormal grain growth in the polycrystalline sintered body of the above mixed oxide ceramics is to use a method for controlling an addition of a third substance.

It is an object of the invention to repeatedly establish the above control technique by adding a third substance to properly control the crystal grain size of the sintered body.

DISCLOSURE OF THE INVENTION

As the rare earth oxide-alumina sintered body capable of realizing the above object, the invention aimed at silica ($SiO_2$) as the third substance and controlled an average crystal grain size of the sintered body into a given size by adding such a substance.

The invention based on such a fundamental thought is a rare earth oxide-alumina-silica sintered body, characterized in that the sintered body is a mixture of rare earth oxide, alumina and silica and an average crystal grain size thereof is not more than 30 $\mu$m. Preferably, the sintered body has a compounding composition of 5–95 wt% of rare earth oxide, 94.9–4.9 wt% of alumina and 0.1–10 wt% of silica and an average crystal grain size of not more than 30 $\mu$m, and more particularly a compounding composition of 64.9–89.9 wt % of rare earth oxide, 10–35 wt % of alumina and 0.1–10 wt % of silica and an average crystal grain size of not more than 10 $\mu$m.

Furthermore, the rare earth oxide-alumina-silica sintered body is preferably a mixture sintered body of $Ln_4Al_2O_9$ compound or $LnAlO_3$ compound and silica, and more particularly a mixture sintered body of 99.9–90 wt % of $Ln_4Al_2O_9$ compound or $LnAlO_3$ compound and 0.1–10 wt % of silica.

Such a rare earth oxide-alumina-silica sintered body can be produced by the following method. That is, the production method of rare earth oxide-alumina-silica sintered body is characterized by comprising (a) a step of mixing given amounts of rare earth oxide powder, alumina powder and silica powder;

(b) a step of drying the resulting mixed powder and shaping into a given green shaped body;

(c) a step of heating the resulting green shaped body at a temperature rising rate of 1°–200° C./minute; and (d) a step of firing the green shaped body at a temperature of 1400°–2000° C. for 0.1–24 hours to form a sintered body.

In this method, the above mixed powder is a mixture of 5–95 wt % of rare earth oxide powder, 94.9–4.9 wt% of alumina powder and 0.1–10 wt % of silica powder.

Preferably, the mixed powder is a mixture of 64.9–89.9 wt % of rare earth oxide, 10–35 wt % of alumina powder and 0.1–10 wt % of silica powder.

And also, the rare earth oxide-alumina-silica sintered body according to the invention can be produced by the following method. That is, the production method of rare earth oxide-alumina-silica sintered body is characterized by comprising (a) a step of mixing given amounts of powder of $Ln_4Al_2O_9$ compound or $LnAlO_3$ compound and silica powder;

(b) a step of drying the resulting mixed powder and shaping into a given green shaped body;

(b) a step of heating the resulting green shaped body at a temperature rising rate of 1°–200° C./minute; and (c) a step of firing the green shaped body at a temperature of 1400°–2000° C. for 0.1–24 hours to form a sintered body.

In this method, the above mixed powder is a mixture of 99.9–90 wt % of $Ln_4Al_2O_9$ compound or $LnAlO_3$ compound and 0.1–10 wt % of silica powder.

Furthermore, in the firing according to the method of the invention, it is preferable that the range of proper firing temperature is 1500°–1800° C., and the firing time is 1–8 hours and the temperature rising rate is 5°–30° C./minute.

In the rare earth oxide-alumina-silica sintered body according to the invention, the average crystal grain size of the constituting particles can easily be controlled to be not more than 30 $\mu$m, desirably not more than 10 $\mu$m by the addition of silica powder. As a result, the rare earth oxide-alumina-silica sintered body according to the invention exhibits the values of strength and toughness which could not be expected in a conventional technique.

According to the invention, in order to control the average crystal grain size of the rare earth oxide-alumina-silica sintered body to be not more than 30 $\mu$m, the composition is 5-95 wt % of rare earth oxide, 94.9-4.9 wt % of alumina and 0.1-10 wt % of silica.

In general, when the crystal grain size of the ceramic particles exceeds 50 μm, the strength is considerably lowered. Therefore, in order to obtain high-strength ceramic material, the crystal grain size should be not more than 50 μm.

Particularly, the control of crystal grain size by the addition of silica effectively acts on $Ln_4Al_2O_9$ compound and $LnAlO_3$ compound producing martensitic transformation in the firing. That is, the rare earth oxide-alumina-silica sintered body being a sintered body of 99.9-90 wt % of $Ln_4Al_2O_9$ compound or $LnAlO_3$ compound and 0.1-10 wt % of silica does not cause any brittleness.

Because, in case of the above rare earth oxide-alumina-silica sintered body, twin is not fundamentally produced in the constituting particles. In this sintered body, a few twins are first produced accompanied with the advance of cracking. However, the resulting twin itself absorbs strain energy of cracking and also the strain energy is absorbed by the motion of the twin plane, so it is considered to largely improve the strength and toughness of the sintered body. This is a toughness enhancing mechanism which has never been known in the conventional technique.

The method of producing the above rare earth oxide-alumina-silica sintered body according to the invention will be described below.

The rare earth oxide-alumina-silica sintered body according to the invention is produced through the following steps:

(a) a step of mixing rare earth oxide powder, alumina powder and silica powder;

(b) a step of drying the resulting mixed powder and shaping it into a given green shaped body;

(c) a step of heating the resulting green shaped body at a temperature rising rate of 1°-200° C./minute; and (d) a step of firing the green shaped body at a temperature of 1400°-2000° C. for 0.1-24 hours to obtain a sintered body.

In this method, it is desirable that the mixed powder is a mixture of 5-95 wt % of rare earth oxide powder, 94.9-4.9 wt % of alumina powder and 0.1-10 wt % of silica powder.

In the method of producing the rare earth oxide-alumina-silica sintered body according to the invention, it is preferable that $Ln_4Al_2O_9$ or $LnAlO_3$ is a main ingredient and silica is added for the substitution of $Al_2O_3$ thereto as the mixed powder.

According to this method, the mixed powder is a mixture of 9-90 wt % of $Ln_4Al_2O_9$ compound or $LnAlO_3$ compound and 0.1-10 wt % of silica powder.

In the production method of the rare earth oxide-alumina-silica sintered body according to the invention, the amount of rare earth oxide powder added is 5-95 wt %. This is due to the fact that when the rare earth oxide powder is less than 5 wt %, the properties of the resulting rare earth oxide-alumina-silica sintered body are biased toward the properties of the alumina sintered body alone, while when the alumina powder is less than 4.9 wt %, the properties of the resulting rare earth oxide-alumina-silica sintered body are biased toward the properties of the rare earth oxide sintered body alone.

Preferably, the amount of rare earth oxide powder is 64.9-89.9 wt %. Because, it is desirable that the sintered body according to the invention is a composition producing $Ln_4Al_2O_9$ or $LnAlO_3$ compound or is near to this composition in order to effectively develop its properties.

In the production method of the invention, the amount of silica powder added is 0.1-10 wt %. This is due to the fact that when it is less than 0.1 wt %, the abnormal growth of crystal grains in the sintered body can not be controlled and the dense sintered body can not be obtained, while when it exceeds 10 wt %, the addition effect is unchangeable but silica powder larger than its solid-soluting amount reacts with the rare earth oxide or alumina powder to undesirably form a silicate compound.

As the rare earth oxide ($Ln_2O_3$) used in the production method of the invention, $Sc_2O_3$, $Y_2O_3$, $La_2O_3$, $CeO_2$, $Pr_2O_3$, $Nd_2O_3$, $Sm_2O_3$, $Eu_2O_3$, $Gd_2O_3$, $Tb_4O_7$, $Dy_2O_3$, $Ho_2O_3$, $Er_2O_3$, $Tm_2O_3$, $Yb_2O_3$ and $Lu_2O_3$ are preferable.

In the production method of the invention, the mixing of the above oxide powders can be conducted by using an ordinary machine used in the mixing or kneading of powders. This mixing is dry-type or wet-type. In case of wet-type mixing, a surfactant such as ethylamine, fish oil or the like can be used to effectively conduct the mixing.

In the production method of the rare earth oxide-alumina-silica sintered body according to the invention, an organic high polymer as a shaping assist (polyethylene glycol, polyvinyl alcohol or the like) may be added to the mixed raw material to apply the known usual shaping technique at the shaping step.

In the production method of the rare earth oxide-alumina-silica sintered body according to the invention, the proper range of the firing temperature is 1400°-2000° C. This is due to the fact that when the firing temperature is lower than 1400° C., the sintering is insufficient and the dense sintered body can not be obtained, while when it exceeds 2000° C., the abnormal growth of crystal grains is caused. The preferable range of the firing temperature is 1500°-1800° C.

In the production method of the invention, the firing time is within a range of 0.1-24 hours. In connection with the above firing temperature, it is long when the firing temperature is low, while it is short when the firing temperature is high. This is due to the fact that when the firing time is less than 0.1 hour, the sintering is insufficient and the dense sintered body can not be obtained, while when it exceeds 24 hours, the abnormal growth of crystal grains is caused. The preferable firing time is within a range of 1-8 hours.

In the production method of the invention, the temperature rising rate in the firing is within a range of 1°-200° C./minute. This is due to the fact that when the rate is slower than 1° C./minute, the sintering takes a long time in view of economical reason, while when it faster than 200° C./minute, the dense sintered body is not obtained. The preferable temperature rising rate is within a range of 5°-30° C./minute.

Moreover, the atmosphere in the firing is preferably an oxidizing atmosphere, or may be a non-oxidizing atmosphere (e.g. nitrogen gas, argon gas, helium gas). Further, the firing may be carried out under vacuum.

BEST MODE FOR CARRYING OUT THE INVENTION

EXAMPLE 1

(1) A mixed powder of 60 g of $Y_2O_3$ powder, 13.5 g of $Al_2O_3$ powder and 1.5 g of $SiO_2$ powder is placed in 50 ml of alcohol and further 1 ml of diethylamine is added, which is wet-mixed in a ball mill for 48 hours.

(2) After the completion of the mixing, the resulting mixture is heated at 60° C. to evaporate alcohol, further mixed with an aqueous solution of 5% polyethylene glycol and then dried. The mixture is shaped into a green shaped body having a size of $45\times20\times4$ $mm^3$.

(3) The green shaped body is heated to 500° C. in air at a temperature rising rate of 2° C./minute and held at 500° C. for 2 hours to conduct calcination.

(4) The calcined body is heated to 1700° C. in air at a temperature rising rate of 10° C./minute and held at 1700° C. for 1 hour to obtain a sintered body.

The resulting sintered body has an average crystal grain size of 4 μm. Further, the bending strength of the sintered body is 700 MPa, and the toughness value at breakage is $K_{IC}=10$ MP·m$^{\frac{1}{2}}$.

EXAMPLE 2

(1) A mixed powder of 87.7 g of $Ho_2O_3$ powder, 11.8 g of $Al_2O_3$ powder and 0.5 g of $SiO_2$ powder is placed in 70 ml of ethyl alcohol and further 1 ml of diethylamine is added, which is wet-mixed in a ball mill for 72 hours.

(2) After the completion of the mixing, the resulting mixture is heated at 60° C. to evaporate alcohol, further mixed with an aqueous solution of 5% polyethylene glycol and then dried. The mixture is shaped into a green shaped body having a size of $45\times20\times4$ $mm^3$.

(3) The green-shaped body is heated to 500° C. in air at a temperature rising rate of 2° C./minute and held at 500° C. for 2 hours to conduct calcination.

(4) The calcined body is heated to 1600° C. in air at a temperature rising rate of 10° C./minute and held at 1600° C. for 4 hours to obtain a sintered body.

The resulting sintered body has an average crystal grain size of 3 μm. Further, the bending strength of the sintered body is 700 MPa, and the toughness value at breakage is $K_{IC}=9$ MP·m$^{\frac{1}{2}}$.

EXAMPLE 3

(1) A mixed powder of 74.6 g of $La_2O_3$ powder, 23.4 g of $Al_2O_3$ powder and 2 g of $SiO_2$ powder is placed in 80 ml of ethyl alcohol and further 1 ml of diethylamine is added, which is wet-mixed in a ball mill for 48 hours.

(2) After the completion of the mixing, the resulting mixture is heated at 60° C. to evaporate alcohol, further mixed with an aqueous solution of 5% polyethylene glycol and then dried. The mixture is shaped into a green shaped body having a size of $45\times20\times4$ $mm^3$.

(3) The green shaped body is heated to 500° C. in air at a temperature rising rate of 2° C./minute and held at 500° C. for 2 hours to conduct calcination.

(4) The calcined body is heated to 1500° C. in air at a temperature rising rate of 10° C./minute and held at 1500° C. for 8 hours to obtain a sintered body.

The resulting sintered body has an average crystal grain size of 5 μm. Further, the bending strength of the sintered body is 600 MPa, and the toughness value at breakage is $K_{IC}=6$ MP·m$^{\frac{1}{2}}$.

EXAMPLE 4

(1) A mixed powder of 65.08 g of $Yb_2O_3$ powder, 8.42 g of $Al_2O_3$ powder and 1.5 g of $SiO_2$ powder is placed in 80 ml of ethyl alcohol and further 1 ml of diethylamine is added, which is wet-mixed in a ball mill for 48 hours.

(2) After the completion of the mixing, the resulting mixture is heated at 60° C. to evaporate alcohol, further mixed with an aqueous solution of 5% polyethylene glycol and then dried. The mixture is shaped into a green shaped body having a size of $45\times20\times4$ $mm^3$.

(3) The green shaped body is heated to 500° C. in air at a temperature rising rate of 2° C./minute and held at 500° C. for 2 hours to conduct calcination.

(4) The calcined body is heated to 1600° C. in air at a temperature rising rate of 10° C./minute and held at 1600° C. for 8 hours to obtain a sintered body.

The resulting sintered body has an average crystal grain size of 4 μm. Further, the bending strength of the sintered body is 700 MPa, and the toughness value at breakage is $K_{IC}=9$ MP·m$^{\frac{1}{2}}$.

EXAMPLE 5

(1) A mixed powder of 90 g of $Er_2O_3$ powder, 23.8 g of $Al_2O_3$ powder and 3 g of $SiO_2$ powder is placed in 70 ml of ethyl alcohol and further 1 ml of diethylamine is added, which is wet-mixed in a ball mill for 72 hours.

(2) After the completion of the mixing, the resulting mixture is heated at 60° C. to evaporate alcohol, further mixed with an aqueous solution of 5% polyethylene glycol and then dried. The mixture is shaped into a green shaped body having a size of $45\times20\times4$ $mm^3$.

(3) The green shaped body is heated to 500° C. in air at a temperature rising rate of 2° C./minute and held at 500° C. for 2 hours to conduct calcination.

(4) The calcined body is heated to 1650° C. in air at a temperature rising rate of 10° C./minute and held at 1650° C. for 3 hours to obtain a sintered body.

The resulting sintered body has an average crystal grain size of 6 μm. Further, the bending strength of the sintered body is 700 MPa, and the toughness value at breakage is $K_{IC}=8$ MP·m$^{\frac{1}{2}}$.

EXAMPLE 6

(1) A mixed powder of 75.2 g of $Nd_2O_3$ powder, 22.8 g of $Al_2O_3$ powder and 2 g of $SiO_2$ powder is placed in 80 ml of ethyl alcohol and further 1 ml of diethylamine is added, which is wet-mixed in a ball mill for 48 hours.

(2) After the completion of the mixing, the resulting mixture is heated at 60° C. to evaporate alcohol, further mixed with an aqueous solution of 5% polyethylene glycol and then dried. The mixture is shaped into a green shaped body having a size of $45\times20\times4$ $mm^3$.

(3) The green shaped body is heated to 500° C. in air at a temperature rising rate of 5° C./minute and held at 500° C. for 2 hours to conduct calcination.

(4) The calcined body is heated to 1650° C. in air at a temperature rising rate of 10° C./minute and held at 1650° C. for 2 hours to obtain a sintered body.

The resulting sintered body has an average crystal grain size of 4 μm. Further, the bending strength of the sintered body is 600 MPa, and the toughness value at breakage is $K_{IC}=6$ MP·m$^{\frac{1}{2}}$.

The rare earth oxide-alumina-silica sintered bodies obtained according to the method of the invention are dense and have no pore and are constituted with particles having an average crystal grain size of not more than 30 μm. Furthermore, the sintered bodies according to the invention are confirmed to show strength and toughness value at breakage enough to be put into practical use. Particularly, the toughness value at breakage is about 2–3 times those of alumina and mullite.

INDUSTRIAL APPLICABILITY

As mentioned above, according to the invention, rare earth oxide-alumina-silica sintered bodies having high density and having no pore and having high strength and toughness and uniform structure can easily be obtained.

Therefore, the rare earth oxide-alumina-silica sintered bodies according to the invention are effectively used in wide fields such as engine parts, gas turbine blade, gas turbine parts, corrosion resistant equipment parts, crucible, parts for ball mill, heat exchanger for high temperature furnace, heat resistant material, heat resistant material for high flying body, burning tube, die cast parts, insulating material, material for nuclear fusion furnace, material for nuclear reactor, material for solar furnace, tools, heat insulating material, substrate for electron circuit, sealing material, parts for joint and valve, biomaterial for artificial bone, artificial toothroot or the like, inductance material, knife and cutter blade, sport goods, pump, nozzle, magnetic head, roller, guide, bearing, ferrule and others.

We claim:

1. A rare earth oxide-alumina-silica sintered body being a mixture of 5–95 wt % rare earth oxide, limited to lanthonoids, 94.9–4.9 wt % alumina and 0.1–10 wt % silica and having an average crystal grain size of not more than 30 μm.

2. A rare earth oxide-alumina-silica sintered body being a mixture of $Ln_4Al_2O_3$ compound wherein Ln is selected from the group consisting of Y, Sm, Eu, Gd, Tb, Dy, Ho, Er, Tm, Yb, Lu and a mixture thereof and silica and having an average crystal grain size of not more than 30 μm, wherein the amount of silica is 0.1–10 wt %.

3. A rare earth oxide-alumina-silica sintered body being a mixture of $LnAlO_3$ compound wherein Ln is selected from the group consisting of Y, La, Ce, Pr, Nd, Sm, Eu, Gd, Tb, Dy, Ho, Er, Tm, Yb, Lu and a mixture thereof and silica and having an average crystal grain size of not more than 30 μm, wherein the amount of silica is 0.1–10 wt %.

4. The rare earth oxide-alumina-silica sintered body according to claim 1, wherein said average crystal grain size of the sintered body is not more than 10 μm.

5. The rare earth oxide-alumina-silica sintered body according to claim 1, wherein said sintered body is a sintered body of 64.9–89.9 wt % of rare earth oxide, 10–35 wt % of alumina and 0.1–10 wt % of silica.

6. A method of producing a rare earth oxide-alumina-silica sintered body, which comprises the steps of:
 (a) a step of mixing rare earth oxide powder, limited to lanthanoids, alumina powder and silica powder;
 (b) a step of drying the resulting mixed powder and shaping into a shaped green body;
 (c) a step of heating the resulting shaped green body to 500° C. in air at a temperature rising rate of 1°–200° C./minute and held at 500° C. for 2 hours to conduct calcination; and
 (d) a step of firing the calcined body at a temperature of 1400°–2000° C. for 0.1–24 hours to form a sintered body.

7. The method according to claim 6, wherein said mixed powder is a mixture of 5–95 wt % of rare earth oxide, 94.9–4.9 wt % of alumina and 0.1–10 wt % of silica.

8. The method according to claim 6, wherein said mixed powder is a mixture of 64.9–89.9 wt % of rare earth oxide, 10–35 wt % of alumina and 0.1–10 wt % of silica.

9. The method according to claim 6, wherein said mixed powder is a mixed powder of $Ln_4Al_2O_3$ compound wherein Ln is selected from the group consisting of Y, Sm, Eu, Gd, Tb, Dy, Ho, Er, Tm, Yb, Lu and a mixture thereof and 0.1–10 wt % silica.

10. The method according to claim 6, wherein said mixed powder is a mixed powder of $LnAlO_3$ compound wherein Ln is selected from the group consisting of Y, La, Ce, Pr, Nd, Sm, Eu, Gd, Tb, Dy, Ho, Er, Tm, Yb, Lu and a mixture thereof and 0.1–10 wt % silica.

11. The method according to claim 6, wherein said firing is conducted at a temperature rising rate of 5°–30° C./minute, a firing temperature of 1500°–1800° C. and a firing time of 1–8 hours.

12. The rare earth oxide-alumina-silica sintered body according to claim 2, wherein said average crystal grain size of the sintered body is not more than 10 μm.

13. The rare earth oxide-alumina-silica sintered body according to claim 3, wherein said average crystal grain size of the sintered body is not more than 10 μm.

* * * * *